United States Patent
Caylor et al.

(10) Patent No.: US 10,446,278 B2
(45) Date of Patent: Oct. 15, 2019

(54) NON-INTRUSIVE ERROR DETECTION TECHNIQUES FOR CONTROL AND SHUTDOWN ROD POSITION IN NUCLEAR REACTORS

(71) Applicant: ANALYSIS AND MEASUREMENT SERVICES CORPORATION, Knoxville, TN (US)

(72) Inventors: Samuel Caylor, Knoxville, TN (US); Hashem M. Hashemian, Knoxville, TN (US); Gregory W. Morton, Knoxville, TN (US)

(73) Assignee: Analysis and Measurement Services Corporation, Knoxville, TN (US)

( * ) Notice: Subject to any disclaimer, the term of this patent is extended or adjusted under 35 U.S.C. 154(b) by 296 days.

(21) Appl. No.: 15/247,169

(22) Filed: Aug. 25, 2016

(65) Prior Publication Data

US 2016/0365161 A1 Dec. 15, 2016

Related U.S. Application Data

(62) Division of application No. 13/523,277, filed on Jun. 14, 2012, now Pat. No. 9,431,137.

(51) Int. Cl.
| | |
|---|---|
| *G21C 7/36* | (2006.01) |
| *G21C 17/12* | (2006.01) |
| *G21C 17/00* | (2006.01) |
| *G21D 3/00* | (2006.01) |
| *G21C 7/10* | (2006.01) |

(52) U.S. Cl.
CPC ............... *G21C 7/36* (2013.01); *G21C 17/00* (2013.01); *G21C 17/12* (2013.01); *G21D 3/001* (2013.01); *G21C 7/10* (2013.01); *Y02E 30/40* (2013.01)

(58) Field of Classification Search
CPC .................................. G21C 7/36; G21C 77/12
USPC ................................................... 376/258, 259
See application file for complete search history.

(56) References Cited

U.S. PATENT DOCUMENTS

| | | | |
|---|---|---|---|
| 6,868,357 B2 | 3/2005 | Furse | |
| 6,937,944 B2 | 8/2005 | Furse et al. | |
| 7,271,596 B2 | 9/2007 | Furse et al. | |
| 7,495,450 B2 | 2/2009 | Furse et al. | |
| 8,351,561 B2 * | 1/2013 | Hashemian | G21C 7/08 |
| | | | 376/258 |
| 9,431,137 B2 * | 8/2016 | Morton | G21C 17/00 |

* cited by examiner

*Primary Examiner* — Sharon M Davis
(74) *Attorney, Agent, or Firm* — Pitts & Lake, P.C.

(57) ABSTRACT

Non-intrusive error detection techniques for control and shutdown rod position in nuclear reactors, including methods of monitoring digital rod position indication (DRPI) signals of a DRPI system of a nuclear power plant. The methods include acquiring digital rod position signals at a point between a DRPI display cabinet and a DRPI data cabinet of the DRPI system, and processing the digital rod position signals to identify variations in a signal level and a signal timing of the digital rod position signals to determine rod position errors of the DRPI system.

3 Claims, 3 Drawing Sheets

NON-INTRUSIVE ERROR DETECTION TECHNIQUES FOR CONTROL AND SHUTDOWN ROD POSITION IN NUCLEAR REACTORS

CROSS-REFERENCE TO RELATED APPLICATIONS

This application is a divisional of U.S. application Ser. No. 13/523,277, filed on Jun. 14, 2012, the contents of which are hereby incorporated by reference herein in their entirety.

FIELD OF INVENTIVE CONCEPT

The present general inventive concept relates to a diagnostic system to monitor rod position indication signals in a nuclear power plant, and more particularly relates to systems and methods of performing signal and data diagnostics on control rod position indication systems of a nuclear reactor, including non-intrusive error detection techniques for control and shutdown rod position in nuclear reactors.

BACKGROUND

In a Pressurized Water Reactor (PWR), the power level of a nuclear reactor is typically controlled by inserting and retracting control rods, which for purposes of this application include the shutdown rods of the reactor core. The control rods are moved by a Control Rod Drive Mechanism (CRDM), which typically include electromechanical jacks that raise or lower the control rods in increments. Known CRDMs include a lift coil, a moveable gripper coil, and a stationary gripper coil that are controlled by a Rod Control System (RCS) and a ferromagnetic drive rod that is coupled to the control rod and moves within the pressure housing. The drive rod includes a number of circumferential grooves at intervals ("steps") that define the range of movement for the control rod. For example, a typical drive rod contains approximately ⅝ inch intervals and 231 grooves, although this number may vary.

The moveable gripper coil mechanically engages the grooves of the drive rod when energized and disengages from the drive rod when de-energized. Energizing the lift coil raises the moveable gripper coil (and the control rod if the moveable gripper coil is energized) by one step. Energizing the moveable gripper coil and de-energizing the lift coil moves the control rod down one step. Similarly, when energized, the stationary gripper coil engages the drive rod to maintain the position of the control rod and, when de-energized, disengages from the drive rod to allow the control rod to move. The RCS typically includes a logic cabinet and a power cabinet. The logic cabinet receives manual demand signals from an operator or automatic demand signals from Reactor Control and provides the command signals needed to operate the shutdown and control rods according to a predetermined schedule. The power cabinet provides the programmed DC current to the operating coils of the CRDM.

Known PWR designs are challenged in that they do not have adequate direct indication of the actual position of each control rod. Instead, step counters associated with the control rods are typically maintained by the RCS and rod position indication (RPI) systems to monitor the positions of the control rods within the reactor. The associated step counter is incremented or decremented when movement of a control rod is demanded and successful movement is verified. Because the step counter only reports the expected position of the control rod, certain conditions can result in the step counter failing and deviating from the actual position of the control rod. In certain situations where the actual position of the control rod is known, the step counter can be manually adjusted to reflect the actual position. However, if the actual position of the control rod is not known, a plant shutdown may be required so that the step counters to be initialized to zero while the control rods are at core bottom.

The RPI systems derive the axial positions of the control rods by direct measurement of drive rod positions. Currently both analog rod position indication (ARPI) systems and digital rod position indication (DRPI) systems are in use in PWRs. A conventional DRPI system includes two coil stacks for each control rod and the associated DRPI electronics for processing the signals from the coil stacks. Each coil stack is an independent channel of coils placed over the pressure housing. Each channel typically includes 21 coils, and the coils are interleaved and positioned at approximately 3.75 inch intervals (6 steps). The DRPI electronics for each coil stack of each control rod are located in a pair of redundant data cabinets (Data Cabinets A and B). Although intended to provide independent verification of the control rod position, conventional RPI systems are not accurate to fewer than 6 steps. For example, the overall accuracy of a DRPI system is considered to be about ±3.75 inches (6 steps) with both channels functioning and ±7.5 inches using a single channel (12 steps).

In contrast to conventional DRPI systems, conventional ARPI systems determine the rod position based on the amplitude of the DC output voltage of an electrical coil stack linear variable differential transformer. The overall accuracy of a properly calibrated ARPI system is considered to be about ±7.5 inches (12 steps). Neither conventional ARPI systems nor conventional DRPI systems are capable of determining the actual positions of the control rods. In the event of a step counter failure, plant shutdown for re-initialization of the step counter is required as the approximate positions of the control rods reported by conventional RPI are of little or no value.

For purposes of this application, the phrase "control rod" is used generically to refer to a unit for which separate axial position information is maintained, such as a group of control rods physically connected in a cluster assembly. The number of control rods can vary according to the plant design. For example, a typical four-loop PWR has 53 control rods. Each control rod requires its own sets of coils having one or more channels and the DRPI electronics associated with each channel. Thus, in a typical four-loop PWR, the entire DRPI system would include 53 coil stacks, each having two independent channels, and 106 DRPI electronics units. Further, in this application, the phrase "coil stack" is used generically to refer to the detector coils associated with each control rod and should be understood to include either or both channels of detector coils. Thus, a measurement across a coil stack contemplates the value across both channels combined and/or the value across a single channel.

Over time, aging and obsolescence issues have led to an increase in problems with conventional DRPI systems including analog card failures and coil cable connection problems that, in some cases, may result in unplanned reactor trips. These problems, along with plans for plant life extension, have prompted the industry to actively seek viable options to monitor the health and accuracy of the DRPI systems and/or to replace failing systems in order to ensure reliable plant operations for decades to come.

In addition to obsolescence concerns, the lack of diagnostic capabilities is a significant challenge. Since conventional RPI systems do not provide diagnostic information on their health other than the current rod position indication, diagnostics of the RPI system is limited to periods when the PWR is offline. The primary benefit of offline diagnostics is to catch obvious failures resulting from reassembly of the reactor. However, in between refueling outages, RPI failures can occur without warning, which leads to increased costs for the plant, especially if replacement parts cannot be obtained in a timely manner. Without active monitoring, plant engineers cannot identify problems developing in RPI systems and are unable to take preemptive actions, such as obtaining necessary replacement parts ahead of time and replacing failing components at the next scheduled outage. Instead, plants typically begin remedial actions after an actual failure occurs.

Beyond the technical challenges of controlling conventional DRPI systems, regulatory issues exist. Many existing PWRs are approaching the end of qualified life for several components of the conventional DRPI systems causing a demand for replacement options. There has been a significant push in recent years for plants to replace aging analog systems with digital systems made from commercially-available off-the-shelf parts. Using readily-available commercial parts provide plants more options for replacement in the future.

BRIEF SUMMARY

Example embodiments of the present general inventive concept provide improved systems and methods of monitoring digital rod position indication signals in nuclear power plants. Example embodiments can perform signal and data diagnostics on control rod position indication systems in a nuclear power reactor while the reactor is operating.

Additional features and embodiments of the present general inventive concept will be set forth in part in the description which follows and, in part, will be obvious from the description, or may be learned by practice of the present general inventive concept.

Example embodiments of the present general inventive concept can be achieved by providing a diagnostic system to monitor digital rod position indication (DRPI) signals generated by detector coils of a DRPI system of a nuclear power plant, including a digital diagnostic unit connected between a DRPI display cabinet and a DRPI data cabinet of the DRPI system to monitor digital rod position signals of the DRPI data cabinet, wherein the digital diagnostic unit detects variations in the digital rod position signals to determine rod position errors of the DRPI system.

The digital rod position signals can include rod address signals and rod position data signals, and wherein the rod position errors are determined based on signal level variation and/or signal timing variation of the rod address signals and the rod position data signals.

The digital diagnostic unit can detect parity bit errors in the digital rod position signals between the DRPI display cabinet and the DRPI data cabinet.

The digital diagnostic unit can store the measured voltages of the digital rod position signals when a rod position error or a parity bit error is detected.

The digital diagnostic unit can monitor at least one of the signal level variation, the signal timing variation, and the parity bit error of the digital rod position signals to distinguish between errors of the DRPI display cabinet, the DRPI data cabinet, and/or the detector coils.

The digital diagnostic unit can monitor variations in the digital rod position signals while the nuclear power plant is operating.

The digital diagnostic unit can monitor variations in the digital rod position signals to isolate errors of a particular card, cable, or control rod.

The diagnostic unit can monitor the Gray code rod drop signals of the digital rod position signals.

Example embodiments of the present general inventive concept can also be achieved by providing a method of monitoring digital rod position indication (DRPI) signals of a DRPI system of a nuclear power plant, including acquiring digital rod position signals at a point between a DRPI display cabinet and a DRPI data cabinet of the DRPI system, and processing the digital rod position signals to identify variations in a signal level and a signal timing of the digital rod position signals to determine rod position errors of the DRPI system.

The method can further include detecting parity bit errors in the digital rod position data signals between the DRPI display cabinet and the DRPI data cabinet, and using at least one of the signal level variation, the signal timing variation, and the parity bit error to distinguish between errors associated with the DRPI display cabinet and the DRPI data cabinet.

The method can further include combining the DRPI system with a Coil Diagnostic System (CDS) to distinguish between problems with DRPI coils, the DRPI display cabinet, and the DRPI data cabinet.

BRIEF DESCRIPTION OF THE FIGURES

The above-mentioned and additional features and embodiments of the present general inventive concept will become more clearly understood from the following detailed description of the invention read together with the accompanying drawings, in which.

DETAILED DESCRIPTION

The following description is intended to describe various example embodiments of the present general inventive concept, but is in no way intended to limit its application, or uses. Various example embodiments are described below in order to explain the general inventive concept by referring to the figures.

Figure 1:
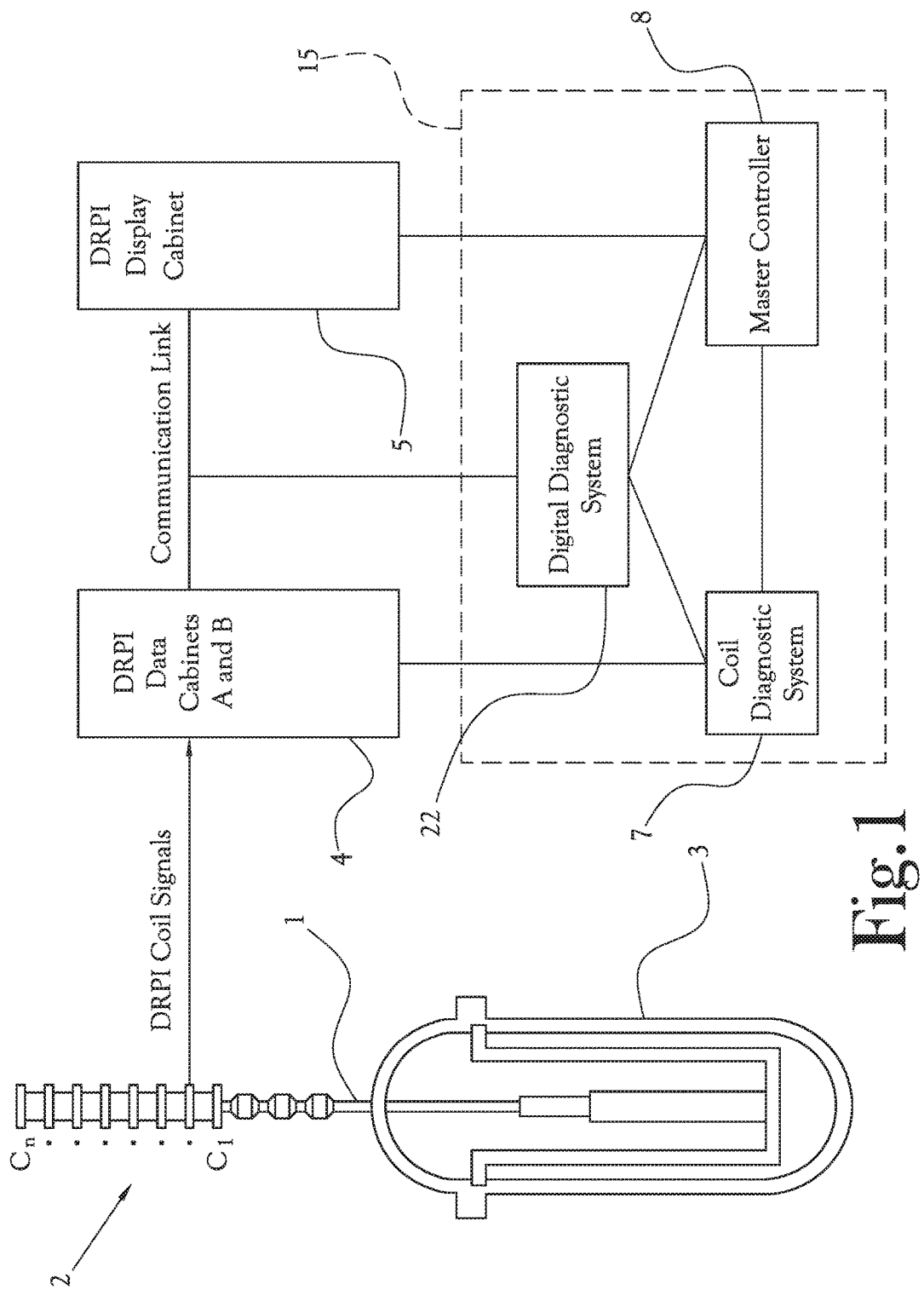
FIG. 1 is a block diagram of conventional DRPI system in a pressurized water reactor (PWR), including an example DRPI diagnostic system according to an example embodiment of the present general inventive concept.

FIG. 1 is a block diagram of a conventional DRPI system in a pressurized water reactor (PWR), including an example DRPI diagnostic system according to an example embodiment of the present general inventive concept. The DRPI diagnostic system can continuously sense and display the positions of each of the control and shutdown rods during plant operation. This can be accomplished through the use of coil stacks which are mounted on the rod control housing above the reactor. The coils can be excited with an AC voltage and magnetically sense the presence of the control rod drive shaft in the center of the coil.

As illustrated in FIG. 1, a typical DRPI system includes a DRPI coil stack 2 including a plurality of DRPI detector coils $C_1$ to $C_n$ to sense the rod position in containment. When the control rod shaft 1 enters the coil, it changes the coil impedance to the AC voltage provided to the coils, thus changing the AC current through the coils. The stepping of rod 1 generates an induced current in the detector coils $C_1$ to $C_n$ to produce DRPI coil signals. The analog electronics in the existing DRPI system detect the change in current and create a digital bit for each coil in the coil stack. Typically, each coil stack 2 is an independent channel of coils placed over a pressure housing 3 of the nuclear power reactor. These digital bits are transmitted to the control room to provide the rod position to a technician via the A and B data cabinets 4 and the display cabinet 5.

DRPI data cabinets A and B (referred to as reference number 4 in FIG. 1) convert the rod position coil signals into digital information. The data cabinets A and B are generally redundant components located inside containment to monitor the coil currents and convert them into a digital position signal. The digital position information presented to the data cabinets A and B are converted to digital information and transmitted to the rod position display cabinet 5 in the control room. The display cabinet 5 addresses the data cabinets A and B, retrieves the digital rod position information, and displays the rod position on the display. The DRPI display cabinet 5 can operate under the control of a master controller 20 to display the rod position and diagnostic information, and/or other system information and controls, as desired.

Referring to FIG. 1, the example DRPI diagnostic system 15 can include a Coil Diagnostic System (CDS) 7 and a Digital Diagnostic System (DDS) 22. The CDS 7 and DDS 22 can be formed as independent hardware subsystems, or could be integrated into a single unit. In one example embodiment, the CDS 7 is installed in containment at the DRPI A and B data cabinets to measure the 21 coil signals from each of the 21 DRPI A or DRPI B coils for every rod. The DDS can be connected in the control room at the display cabinet and can observe the digital rod address and digital rod position data signals between the DRPI A and B cabinets and the DRPI display cabinet.

The CDS 7 and DDS 22 can be integrated with a master controller 20, although it is possible for the components to be formed as separate units, or as combinations of units, without departing from the scope of the present general inventive concept. The master controller 20 can include a human-machine interface (HMI) installed in the control room, to interface with the operator or technician. For example, the master controller 20 can include one or more displays and inputs/outputs to interact and display information to/from the operator or technician, as desired. The DRPI diagnostic system 15 can provide rod position, coil diagnostics, rod drop timing, digital diagnostics, or other information, to monitor operations of nuclear power plants.

Figure 2:
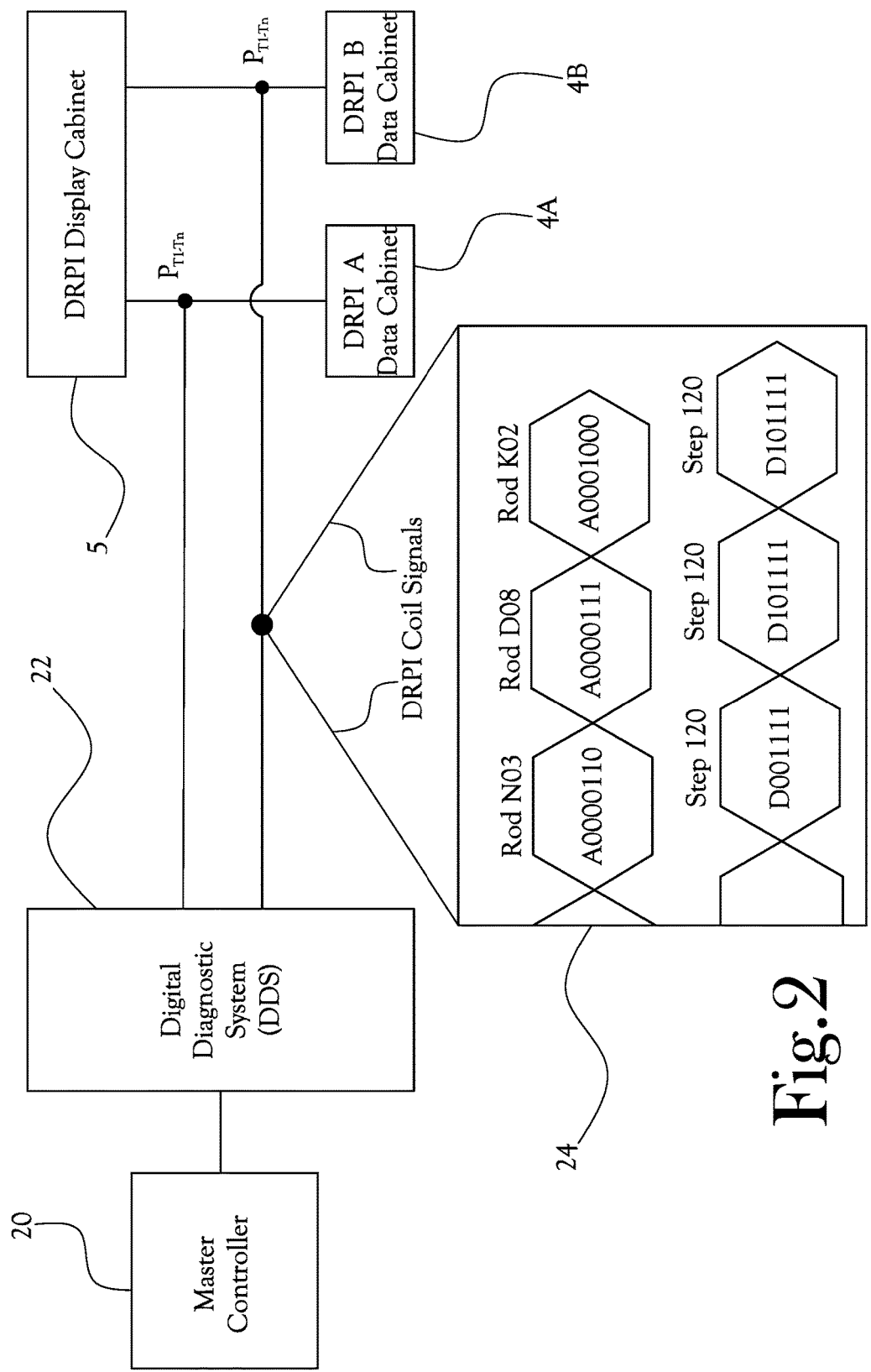
FIG. 2 illustrates an example embodiment of a Digital Diagnostic System to retrofit existing conventional DRPI systems of a nuclear power plant, according to an example embodiment of the present general inventive concept.

FIG. 2 illustrates an example embodiment of a Digital Diagnostic System (DDS) 22 used to retrofit existing conventional DRPI systems in nuclear power plants, according to an embodiment of the present general inventive concept. Referring to FIG. 2, the DDS 22 can be installed in the control room proximate the display cabinet 5, and can measure the digital rod address and digital rod position data signals from the DRPI coil signals, although other locations could be used to house the DDS 22 and/or display cabinets. The DDS 22 can be integrated with a master controller 20, including a human-machine interface. The master controller 20 can also be installed in the control room.

As illustrated in FIG. 2, the DDS 22 can acquire rod position signals at a point between the output from the existing DRPI display cabinet 5 and the DRPI data cabinets 4A, 4B. This enables the DDS 22 to sample the DRPI signal voltages and convert them into digital signals. For example, the DDS 22 can acquire the rod position signals at the test points $PT_1$-$PT_n$ (see FIG. 2) in the display cabinets of the conventional DRPI system. The test points $PT_1$-$PT_n$ provide access to the rod position digital signals, which heretofore were not available during operation. The digital signals are then transmitted to the DDS 22, which may be located in the main control room. The DDS 22 detects changes in the level and/or timing of the digital rod position signals, including changes in the rod address and position data information, to determine rod position errors.

Referring to FIG. 2, reference number 24 identifies a typical address and data communication sequence for a conventional DRPI system. Here, the rod address signals can be sent from the DRPI display cabinet 5 to the DDS 22. In this embodiment, the rod signals include 7 address signal lines (e.g., A0000110, et al.) and 6 data signal lines (e.g., D001111, et al.) for each of the data cabinets 4A, 4B, although various coding schemes and/or protocols could be chosen with sound engineering judgment. In this example, the detector/encoder card for the requested rod's address in the data cabinet can transmit the rod's position in a binary Gray code, wherein the Gray code is comprised of five data bits and one parity bit. In this case, the parity bit can be a 1 if the number of 1's in the address and data bits is odd. This position code can then be converted to a step number and displayed for that rod. In this way, the DDS 22 interprets the Gray code and displays diagnostic and status information.

A system error can be identified as a one bit error which can be detected from a parity bit check. Other bit errors may include, for example, a valid rod position code that is mismatched between DRPI A rod position and DRPI B rod position, which should agree within 12 steps, in this example.

The DDS 22 can be integrated with a Master Controller and human-machine interface 20 installed in the control room to form a system providing digital diagnostics for nuclear power plants. As mentioned above, the DDS 22 can be located in the control room at the display cabinet to measure the digital rod address and digital rod position data signals, although other locations could also be used.

Figure 3:
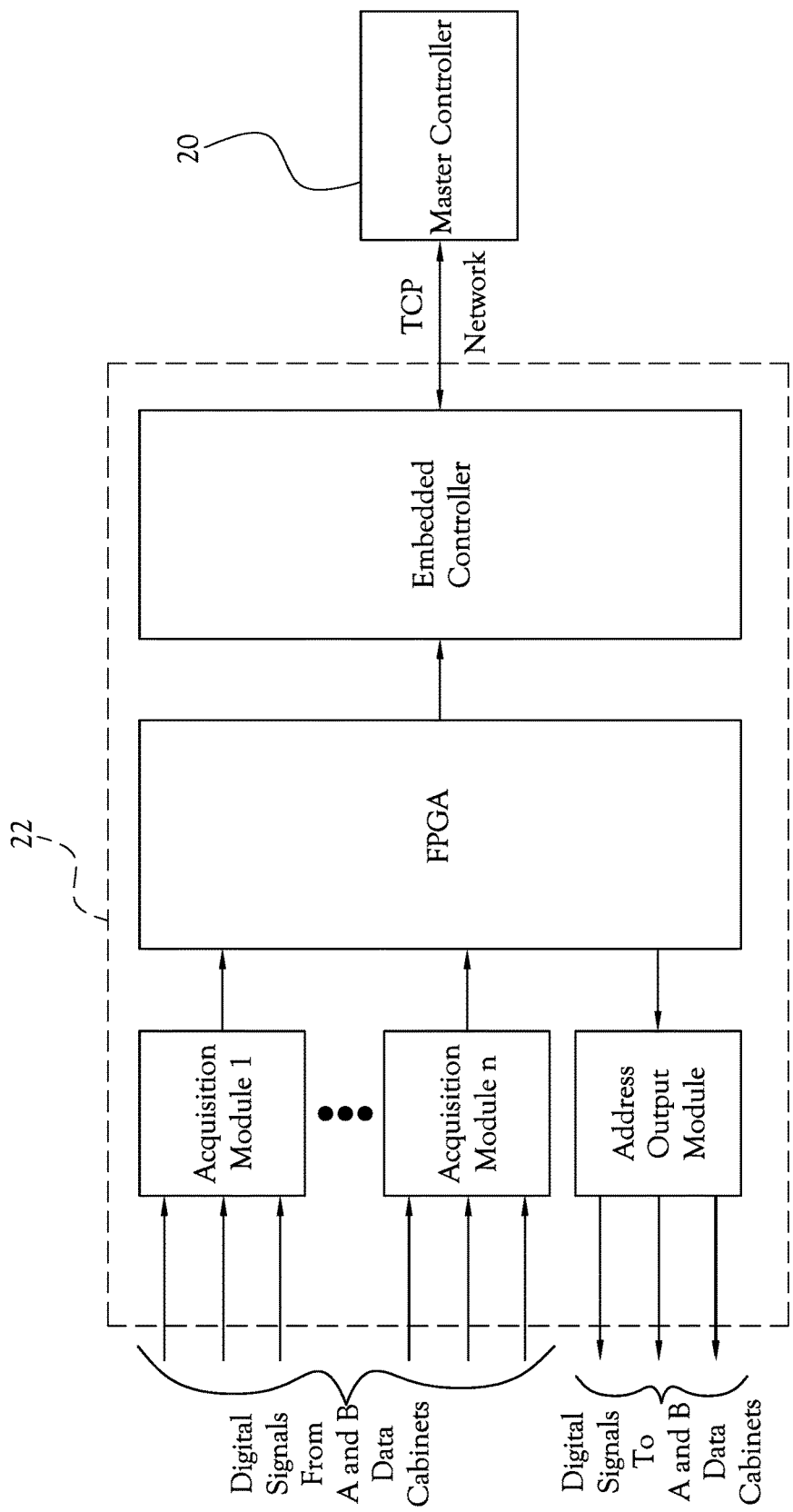
FIG. 3 is a diagram of a Digital Diagnostic System (DDS) in communication with two independent channels of the data cabinets A and B, according to an example embodiment of the present general inventive concept.

FIG. 3 is an example of a DDS 22 in communication with two independent channels of the data cabinets A and B, according to an example embodiment of the present general inventive concept. The illustrated Digital Diagnostic System (DDS 22) is in communication with the data cabinets A and B to sample the DRPI signal voltages and convert them into digital signals. The DDS 22 interprets the binary digital signals and displays diagnostic and status information. The components of the DDS 22 are selected to provide sufficient data transmission speeds to send the sampled data to the master controller and human-machine interface 20 in real time.

In some embodiments, the DDS 22 can include a plurality of data acquisition modules to receive the respective DRPI coil signals from the A and B data cabinets. In FIG. 3 the modules are identified as acquisition Module 1 through acquisition module n. Although a variety of configurations for the DDS 22 could be chosen with sound engineering judgment, one suitable device for performing the functions of the data acquisition modules includes an analog-to-digital (A/D) module with a +/−60V input range capable of simultaneous, isolated, high-speed, differential analog acquisition for both the address bus and the data bus. The A/D modules can be each connected to an field-programmable gate array (FPGA) for acquiring various types of signals including the voltage signals used by the DDS 22. A high speed interface can be provided to allow an external computer to communicate with the FPGA, for example at data rates up to 50 MB/s, or higher. As illustrated in FIG. 3, the FPGA can be connected to an embedded controller, which can be, for example, a CompactRIO (cRIO) remote high speed interface system produced by National Instruments Corporation, which includes swappable I/O modules. The CompactRIO is capable of monitoring the rod address and rod position data. In some example embodiments, the DDS 22 is capable of driving the rod addresses by using a digital input/output (I/O) module that outputs a +/−15V TTL signal to the DRPI data cabinets, but a variety of other types and/or combinations of components could be chosen with sound engineering judgment to achieve the same or similar results. All such variations are intended to remain within the scope of the present general inventive concept. For example, one skilled in the art will recognize that the general specifications described above for the DDS 22 electronics are not intended to be limiting. A variety of other configurations could be used to acquire sufficient data containing information from which the positions of the control rods can be derived.

As described herein, the DDS 22 can distinguish problems with the display cabinet in the control room and problems with the data cabinets in containment. It can also be used to monitor the Gray code signals directly. When used in conjunction with the CDS 7, the DDS 22 can identify a problem with a rod's position indication as a coil, data cabinet, or display cabinet problem. Additionally, the DDS is capable of isolating individual card, cable, and rod problems.

In some embodiments, the DDS 22 can include an embedded system capable of measuring +/−15V signals that are used to transmit the rod address and rod position data. In these cases, the signals can be monitored using an A/D module with a +/−60V input range capable of simultaneous, isolated, high-speed, differential analog acquisition for both the address bus and the data bus.

Instructions can be provided to both the FPGA and the real-time controller of the embedded system used to compute the position information. For example, in a typical address and data communication sequence, the rod address can be sent from the DRPI display. The detector/encoder card for the requested rod's address in the data cabinet in containment can transmit the rod's position in a binary Gray code. This position is then converted to a step number and displayed for that rod.

The DDS can also act as a passive or active DRPI digital Gray code rod drop test system. Instructions provided to a real-time controller of the DDS can be used to collect voltage data and log anomalies with the Address or Data codes. The Master Controller 20 can handle the storage and display of rod diagnostic information.

Instructions provided to the master controller 20, and the DRPI Diagnostic system 15 hardware, enable the system components to be used as a stand-alone system or for performing temporary diagnostic services. For example, the CDS 7 (FIG. 1) can be used as a stand-alone system, interfacing directly with instrumentation already installed in the plant. Likewise, the DDS 22 is capable of being used as an installed system or a temporary diagnostic system. If used as a stand-alone system, the CDS and DDS may incorporate a PC running a version of the Master Controller instructions in order to control the system and view the data and diagnostic information.

Conventional DRPI systems can also perform a rod drop time test by monitoring the voltage across all the coils in the stack while the rod is dropped. The motion of the rod drive shaft through the coil stack induces a current in the coils which is proportional to the drive shaft velocity through the coil stack. Rod drop time testing is typically performed after each refueling outage.

Example embodiments of the present general inventive concept provide a DDS module capable of monitoring the digital rod addresses and digital rod position at the DRPI display cabinet in the control room. When combined with the coil diagnostics system at the DRPI data cabinet in containment, the DDS 22 can identify card problems, cable and connector problems, and power supply problems. This will reduce the amount of reactor trips due to these problems, and minimize the off-line time due to DRPI reactor trips by identifying the DRPI problem during operation of the reactor.

Example embodiment of the present general inventive concept can be achieved by providing a diagnostic system for a digital rod position indication (DRPI) system of a nuclear power plant designed to monitor in real time DRPI signals generated by a plurality of detector coils of the DRPI system while the nuclear power plant is operating, the diagnostic system including a digital diagnostic unit connected in parallel between a DRPI display cabinet and a redundant pair of DRPI A and DRPI B data cabinets, the digital diagnostic unit having inputs configured to receive DRPI signals communicated between the DRPI display cabinet and the DRPI A and B data cabinets, a coil diagnostic unit configured to receive voltage signals from each one of the detector coils, a plurality of data acquisition modules configured to receive digital rod position signals for each detector coil from the DRPI A and B data cabinets, at least one address input/output module configured to drive rod addresses of the digital rod position signals to the DRPI A and B data cabinets, and a gate array module configured to acquire the digital DRPI signals from the data acquisition and address input/output modules, the gate array module having an interface connected with a controller to monitor the digital rod position signals from the DRPI A and B data cabinets for each coil and identify mismatches between a DRPI A rod position of the DRPI A data cabinet and a DRPI B rod position of the DRPI B data cabinet for each coil while the nuclear power plant is operating.

Example embodiments of the present general inventive concept can also be achieved by providing a method of controlling and monitoring digital rod position indication (DRPI) signals of control rods of a DRPI system of a nuclear power plant, including generating addresses signals for a subset of control rods, sequencing through the control rods at a faster rate than the display cabinet, acquiring digital rod position signals at a point between a DRPI display cabinet and a DRPI data cabinet of the DRPI system, and monitoring the Gray code rod drop signals of the digital rod position signals at a faster rate to obtain a more accurate time resolution, thus enabling improved rod diagnostics to detect any slow down or binding as the rods are dropped.

Example embodiments of the present general inventive concept can also be achieved by providing a method of detecting errors in control and shutdown rod position during operation of nuclear reactors, including connecting inputs of a digital diagnostic unit in parallel between a digital rod position indication (DRPI) display cabinet and a redundant pair of DRPI A and DRPI B data cabinets of a DRPI system of a nuclear reactor, receiving DRPI signals that are generated by a plurality of detector coils of the DRPI system and communicated between the DRPI display cabinet and the DRPI A and B data cabinets while the nuclear reactor is operating via the inputs, receiving voltage signals from each one of the detector coils, receiving digital rod position signals for each detector coil from the DRPI A and B data cabinets, monitoring the digital rod position signals from the DRPI and B data cabinets for each coil, and identifying mismatches between a DRPI A rod position of the DRPI A data cabinet and a DRPI B rod position of the DRPI B data cabinet for each coil while the nuclear reactor is operating.

Example embodiments of the present general inventive concept can also be achieved by providing a method of detecting errors in control and shutdown rod position during operation of the nuclear power plant using a diagnostic system for a digital rod position indication (DRPI) system of a nuclear power plant designed to monitor in real time DRPI signals generated by a plurality of detector coils of the DRPI system while the nuclear power plant is operating, the diagnostic system including a digital diagnostic unit having inputs configured to receive DRPI signals communicated between the DRPI display cabinet and the DRPI A and B data cabinets, a coil diagnostic unit configured to receive voltage signals from each one of the detector coils, a plurality of data acquisition modules configured to receive digital rod position signals for each detector coil from the DRPI A and B data cabinets, at least one address input/output module configured to drive rod addresses of the digital rod position signals to the DRPI A and B data cabinets, and a gate array module configured to acquire the digital DRPI signals from the data acquisition and address input/output modules, the gate array module having an interface connected with a controller to monitor the digital rod position signals from the DRPI A and B data cabinets for each coil.

The method can include connecting the inputs of the digital diagnostic unit in parallel between a DRPI display cabinet and a redundant pair of DRPI A and DRPI B data cabinets of the DRPI system to receive the DRPI signals that are communicated between the DRPI display cabinet and the DRPI A and B data cabinets, receiving voltage signals from each one of the detector coils using the coil diagnostic unit, receiving digital rod position signals for each detector coil from the DRPI A and B data cabinets using the plurality of data acquisition modules, driving the rod addresses to the DRPI A and B data cabinets using the at least one address input/output module, acquiring the DRPI signals from the data acquisition and address input/output modules using the gate array module, monitoring the digital rod position signals from the DRPI A and B data cabinets for each coil, and identifying mismatches between a DRPI A rod position of the DRPI A data cabinet and a DRPI B rod position of the DRPI B data cabinet for each coil while the nuclear power plant is operating.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

It is noted that numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings as falling within the scope and spirit of the present general inventive concept, as defined in the appended claims.

The invention claimed is:

1. A method of detecting errors in control and shutdown rod position during operation of a nuclear power plant using a diagnostic system for a digital rod position indication (DRPI) system that monitors in real time DRPI signals generated by a plurality of detector coils of the DRPI system while the nuclear power plant is operating, the diagnostic system comprising a digital diagnostic unit having inputs configured to receive DRPI signals communicated between a DRPI display cabinet and a redundant pair of DRPI A and B data cabinets, a coil diagnostic unit configured to receive voltage signals from each one of the detector coils, a plurality of data acquisition modules configured to receive digital rod position signals for each detector coil from the DRPI A and B data cabinets, at least one address input/output module configured to drive rod addresses of the digital rod position signals to the DRPI A and B data cabinets, and a gate array module configured to acquire the digital DRPI signals from the data acquisition and address input/output modules, the gate array module having an interface connected with a controller to monitor the digital rod position signals from the DRPI A and B data cabinets for each coil, the method comprising:

connecting the inputs of the digital diagnostic unit in parallel between the DRPI display cabinet and the DRPI A and DRPI B data cabinets of the DRPI system;

communicating the DRPI signals between the DRPI display cabinet and the DRPI A and B data cabinets;

receiving voltage signals from each one of the detector coils in the coil diagnostic unit;

receiving digital rod position signals for each detector coil from the DRPI A and B data cabinets in the plurality of data acquisition modules;

driving the rod addresses from the at least one address input/output module to the DRPI A and B data cabinets;

acquiring the digital rod position signals and the rod addresses from the data acquisition and address input/output modules in the gate array module;

monitoring in the controller the digital rod position signals from the DRPI A and B data cabinets for each coil; and identifying mismatches between the DRPI A rod position signal of the DRPI A data cabinet and the DRPI B rod position signal of the DRPI B data cabinet for each coil while the nuclear power plant is operating.

2. The method of claim 1, wherein the monitoring further comprises:

processing the DRPI A rod position signal and the DRPI B rod position signal and identifying variations in a signal level and a signal timing of the digital rod position signals that indicate rod position errors of the DRPI system.

3. The method of claim 2, wherein the monitoring further comprises: detecting parity bit errors in the DRPI A rod position signal and the DRPI B rod position signal and identifying errors associated with the DRPI display cabinet and the DRPI A and DRPI B data cabinets using at least one of the signal level variation, the signal timing variation, and the parity bit error.

* * * * *